United States Patent
Oswal et al.

(10) Patent No.: US 10,200,311 B2
(45) Date of Patent: Feb. 5, 2019

(54) COMPUTER NETWORK CONTROL FOR APPLICATION INSTANTIATION

(71) Applicant: Cisco Technology, Inc., San Jose, CA (US)

(72) Inventors: Anand Oswal, Pleasanton, CA (US); Muninder Singh Sambi, Fremont, CA (US); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 328 days.

(21) Appl. No.: 15/260,048

(22) Filed: Sep. 8, 2016

(65) Prior Publication Data

US 2018/0069809 A1 Mar. 8, 2018

(51) Int. Cl.
*H04L 12/931* (2013.01)
*H04L 12/46* (2006.01)
*H04L 29/12* (2006.01)

(52) U.S. Cl.
CPC ........ *H04L 49/351* (2013.01); *H04L 12/4641* (2013.01); *H04L 49/355* (2013.01); *H04L 61/103* (2013.01); *H04L 61/6022* (2013.01)

(58) Field of Classification Search
CPC ... H04L 49/351; H04L 49/355; H04L 61/103; H04L 61/6022; H04L 12/4641
See application file for complete search history.

(56) References Cited

U.S. PATENT DOCUMENTS

| | | | | |
|---|---|---|---|---|
| 9,559,951 B1* | 1/2017 | Sajassi | .................... | H04L 45/66 |
| 9,983,860 B1* | 5/2018 | Koty | ........................ | H04L 67/10 |
| 2011/0243142 A1* | 10/2011 | Kwon | ................. | H04L 41/5041 370/400 |
| 2014/0223434 A1* | 8/2014 | Mulligan | ............ | G06F 9/45533 718/1 |
| 2015/0124827 A1* | 5/2015 | Rangaraman | ....... | H04L 12/4666 370/392 |
| 2016/0006623 A1* | 1/2016 | Liu | ........................ | H04L 41/145 370/254 |
| 2016/0308762 A1* | 10/2016 | Teng | ........................ | H04L 45/50 |

(Continued)

*Primary Examiner* — Paul H Masur
(74) *Attorney, Agent, or Firm* — Johnson, Marcou & Isaacs, LLC (57) ABSTRACT

An application switch instantiates two application-side network service instances for the same application. Each network service instance is characterized by a common Internet Protocol (IP) address, a common Open Systems Interconnection (OSI) reference model layer 2 (L2) media access control (MAC) address, and a unique (for the application) supplemental L2 identifier. The application switch maintains a mapping between a {client IP address, client port} tuple and a particular instantiated network service instance based at least in part on the supplemental L2 identifier of a particular one of the instantiated first and second network service instances. When the application switch receives a client communication via an application switch client-side network, the application switch determines the particular instantiated network service instance corresponding to the {<client IP address>, <client port>} tuple based on the mapping, and switches the received client communication to the determined application-side network service instance.

20 Claims, 5 Drawing Sheets

(56) References Cited

U.S. PATENT DOCUMENTS

2016/0337175 A1* 11/2016 Rao .................. H04L 49/25
2017/0085502 A1* 3/2017 Biruduraju ............ H04L 49/354
2017/0250945 A1* 8/2017 Wadhwa ............ H04L 12/4633
2017/0310635 A1* 10/2017 Yang ................... H04L 67/1097

* cited by examiner

Instantiate, by an application switch, over an application-side network of the switch, a first network service instance, wherein the first network service instance is characterized by an application-side Internet Protocol (IP) address, an Open Systems Interconnection (OSI) reference model layer 2 (L2) media access control (MAC) address, and a supplemental L2 identifier of a first type and having a first value, and wherein the first network service instance is associated with a first instance of a first application
210

Receive, by the switch, a request to instantiate a network service instance for a second instance of the first application
220

Instantiate, by the switch, in response to the request, a second network service instance characterized by the application-side IP address, the MAC address, and a supplemental L2 identifier of the first type having a different value than the first value, and wherein the second network service instance is associated with a second instance of the first application
230

Maintain, by the application switch, a mapping between a {client IP address, client port} and a particular instantiated network service instance based at least in part on the supplemental L2 identifier of a particular one of the instantiated first and second network service instances
240

COMPUTER NETWORK CONTROL FOR APPLICATION INSTANTIATION

TECHNICAL FIELD

The disclosed technology relates to computer network control. More specifically, embodiments of the disclosed technology employ an Open Systems Interconnection (OSI) reference model layer 2 (L2) supplemental identifier to distinguish between network service instances associated with instances of an application on the application-side of an application switch, while presenting the associated application to clients, on the client-side of the application switch, as originating from a single Internet Protocol (IP) address.

BACKGROUND

A computer network is a telecommunications network that allows computers to exchange data. Network devices that originate, route, and terminate the data are called network nodes. Network nodes can include hosts, such as personal computers, phones, and servers, as well as networking devices, such routers, and switches. In computer networks, network nodes pass data to each other along data connections. Data is typically transferred in the form of packets. Connections between network nodes are established using various media, such as fiber optic cable, coaxial cable, and wireless links.

"Cloud computing" refers to a model for enabling ubiquitous, convenient, on-demand computer network access to a shared pool of configurable computing resources (e.g., networks, servers, storage, applications, and services) that may be rapidly provisioned and released with minimal management effort or service provider interaction. The cloud computing model is characterized by on-demand self-service, broad network access, resource pooling, rapid elasticity, and measured service. Cloud computing service models include software as a service (SaaS), platform as a service (PaaS), infrastructure as a service (IaaS), Data as a Service (DaaS), and Analytics as a Service (AaaS). Cloud computing deployment models include public clouds, private clouds, community clouds, and hybrid combinations thereof. The cloud model can allow end users to reduce capital expenditures and burdensome operating costs associated with maintaining substantial information technology expertise and operating staff in-house.

BRIEF DESCRIPTION OF THE DRAWINGS

FIG. 2, comprising

DESCRIPTION OF EXAMPLE EMBODIMENTS

Overview

Autonomous control of a computer network is one factor in achieving the elasticity, in the face of variable demand for applications, that is a characteristic of effective cloud computing (and also of SaaS outside of cloud computing). Application virtualization is an enabling technology for achieving elasticity through autonomous control of the computer network. With application virtualization, each user of a group of users can interact with an application as though the user was running a dedicated installation of the application in a native environment, while allowing the network operator to more efficiently use compute, storage, and network resources. Application virtualization utilizes a virtualization manager, such as a hypervisor (for use with virtual machines) or a container manager (for use in operating system-level virtualization).

As a continuing example, consider a virtualized word processing application serving anywhere from one to 1000 users on a corporate computer network. Each instance of the application can support 50 users. In some circumstances, the capacity of an application instance depends not only on the number of users or connections, but on other factors such as the central processing unit (CPU) load of the application instance. Under various types of logic, including machine learning, a virtualization manager can create additional application instances as demand increases. In existing approaches, the virtualization manager, when creating another instance of an application to meet increasing demand, establishes new network connection metadata for the new instance, often including a new Internet Protocol (IP) address and a new Media Access Control (MAC) address for the new application instance. The new network connection metadata for new application instances is communicated to clients of the virtualized application and tracked by the virtualization manager, or similar device such as a load balancer, during decreases in demand.

Embodiments of the technology disclosed herein employ an application switch to establish and maintain the network connection (called a "network service instance") for the new application instance on the application-side of the application switch. This context is transparent to clients on the client-side of the application switch, but allows the virtualization manager and the application switch to distinguish between instances at a lower level in the OSI model (helpful in improving autonomous operation), even while using an otherwise identical copy of the application.

In particular, in some embodiments, an application switch instantiates a first network service instance over an application-side network of the application switch. The first network service instance is characterized by a first application-side Internet Protocol (IP) address, an Open Systems Interconnection (OSI) reference model layer 2 (L2) media access control (MAC) address, and a supplemental L2 identifier of a first type and having a first value. The first network service instance is associated with a first instance of a first application. The application switch receives a request to instantiate a network service instance associated with a second instance of the first application.

In response to the request, the application switch instantiates a second network service instance. The second network service instance is characterized by the first application-side IP address, the MAC address, and a supplemental L2 identifier of the first type having a different value than the first value.

The application switch maintains a mapping between a {client IP address, client port} tuple and a particular instantiated network service instance based at least in part on the supplemental L2 identifier of a particular one of the instantiated first and second network service instances. The application switch receives, via a client-side network of the application switch, a client communication comprising a {<client IP address>, <client port>} tuple directed to a client-side IP address of the application switch corresponding to the first application.

The application switch determines a particular instantiated network service instance corresponding to the {<client IP address>, <client port>} tuple based on the mapping, and switches the received client communication to the determined network service instance via the application-side network.

By using and relying on the methods and systems described herein, a computer network operator can offload the network connection portion of a virtualization task to an application switch, and insulate clients from changes to the virtualized application. As such, the systems and methods described herein may be employed to reduce the latency with which a virtualized application scales in response to increasing demand, thereby improving elasticity. Hence, additional users of such technology can continue to experience application startup times similar to those of existing users.

Turning now to the drawings, in which like numerals represent like (but not necessarily identical) elements throughout the figures, example embodiments are described in detail.

Example Architectures

In example architectures for the technology, while certain servers, systems, and devices shown in the architecture are represented by one instance of the server, system, or device, multiple instances of each can be used. Further, while certain aspects of operation of the present technology are presented in examples related to the figures to facilitate enablement of the claimed invention, additional features of the present technology, also facilitating enablement of the claimed invention, are disclosed elsewhere herein.

Figure 1:
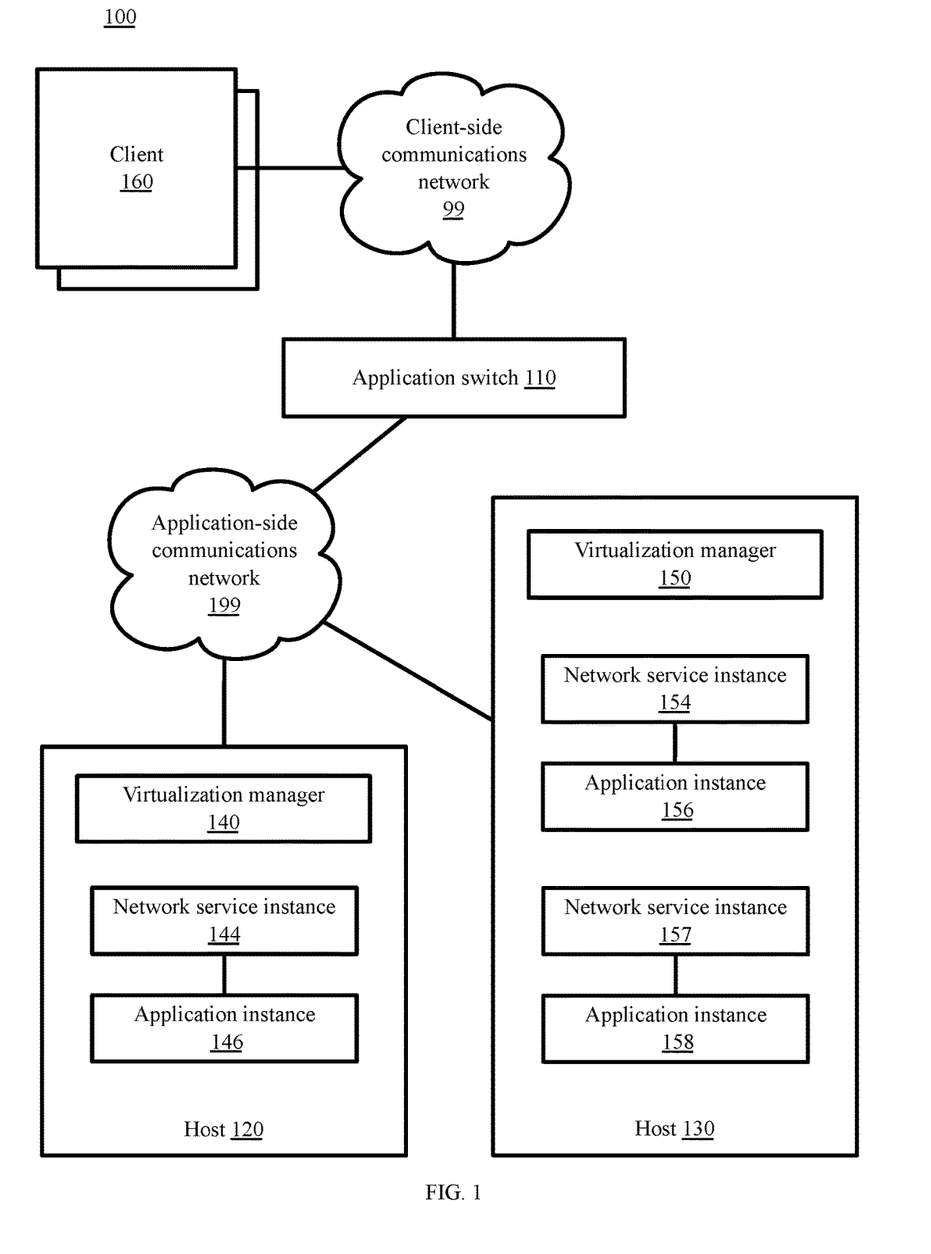
FIG. 1 is a block diagram depicting an architecture for computer network control for application instantiation, in accordance with certain example embodiments of the disclosed technology.

As depicted in FIG. 1, an architecture 100 to control computer networks to support application instantiation includes, an application switch 110, hosts (such as host 120 and host 130), and clients (such as client 160); each of which may be configured to communicate with one or both of client-side communications networks 99 and application-side communications network 199. In some embodiments, a user associated with a device must install an application and/or make a feature selection to obtain the benefits of the technology described herein.

Each communications network 99 and 199 includes one or more wired or wireless telecommunications means by which the network computing devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 160 can include a communication module capable of transmitting and receiving data over one or both communications networks 99 and 199. For example, each network device can comprise a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

The network connections illustrated are example and other means of establishing communications between the computers and devices can be used. Additionally, those having ordinary skill in the art and having the benefit of the present disclosure will appreciate that the network devices illustrated in FIG. 1 may have any of several other suitable computer system configurations. For example, a user network device 160 embodied as a mobile phone or handheld computer may not include all the components described above.

In example embodiments, the network computing devices, and any other computing machines associated with the technology presented herein, may be any type of computing machine such as, but not limited to, those discussed in more detail with respect to FIG. 5. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 5. The computing machines discussed herein may communicate with one another, as well as with other computing machines or communication systems over one or more networks, such as networks 99 and 199. Each network 99 and 199 may include various types of data or communications network, including any of the network technology discussed with respect to FIG. 5.

The example embodiments illustrated in the following figures are described hereinafter with respect to the components of the example operating environment and example architecture described elsewhere herein. The example embodiments may also be practiced with other systems and in other environments.

In the example architecture 100 of FIG. 1, an application switch 110 can control the access that a client 160 has to an application instance, such as application instance 146, of a given application over network 99 and network 199. In the continuing example, client 160 is a desktop computer employing a browser to access a word processing application, of which three instances (application instances 146, 156, and 158) are shown in communication with application switch 110 over application-side network 199. The application switch 110 insulates the client 160 from some implementation details (such as application-side communications network 199, virtualization manager 140, and network service instance 144) on the application-side of the application switch 110.

Each host 120, 130 on the application-side of application switch 110 includes a virtualization manager 140, 150, respectively. Each virtualization manager 140, 150 can be a hypervisor or a container manager to oversee the creation and operation of a virtualized application instance (such as application instance 146). A hypervisor is used to manage a virtualized application that is implemented using virtual machines (VMs), while a container manager is used to manage an OS-level virtualized application implemented in a container. In the continuing example, virtualization manager 140 is an OS-level virtualization application (OSLVA).

In either approach to virtualization, VMs or containers, a virtualized application 140 uses both the executable application code (the application instance 146) and the network 199 connectivity through the application switch 110 (the network service instance 144), to provide the client 160 with access to the application via network 99.

By using and relying on the methods and systems described herein, a computer network operator can offload the application-side network 199 connection portion of a virtualization task to an application switch 110, and insulate clients 160 from changes to the virtualized application. As such, the systems and methods described herein may be employed to reduce the latency with which a virtualized application scales in response to increasing demand, thereby improving elasticity. Hence, additional users of such technology can continue to experience application startup times similar to those of existing users.

Example Processes

Figure 2A:
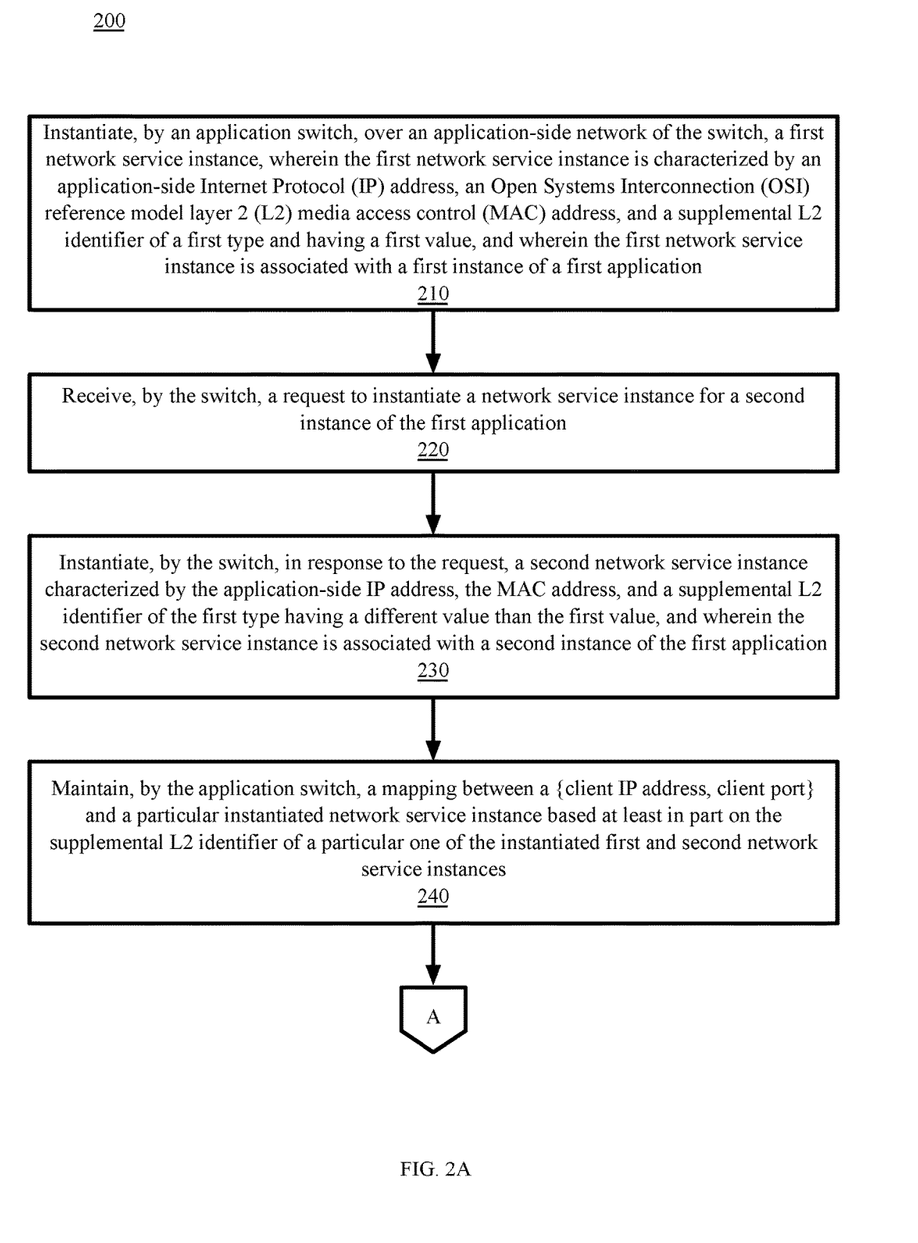
FIGS. 2A and 2B, is a block flow diagram depicting methods to control computer networks to support application instantiation, in accordance with certain example embodiments.
Figure 2B:
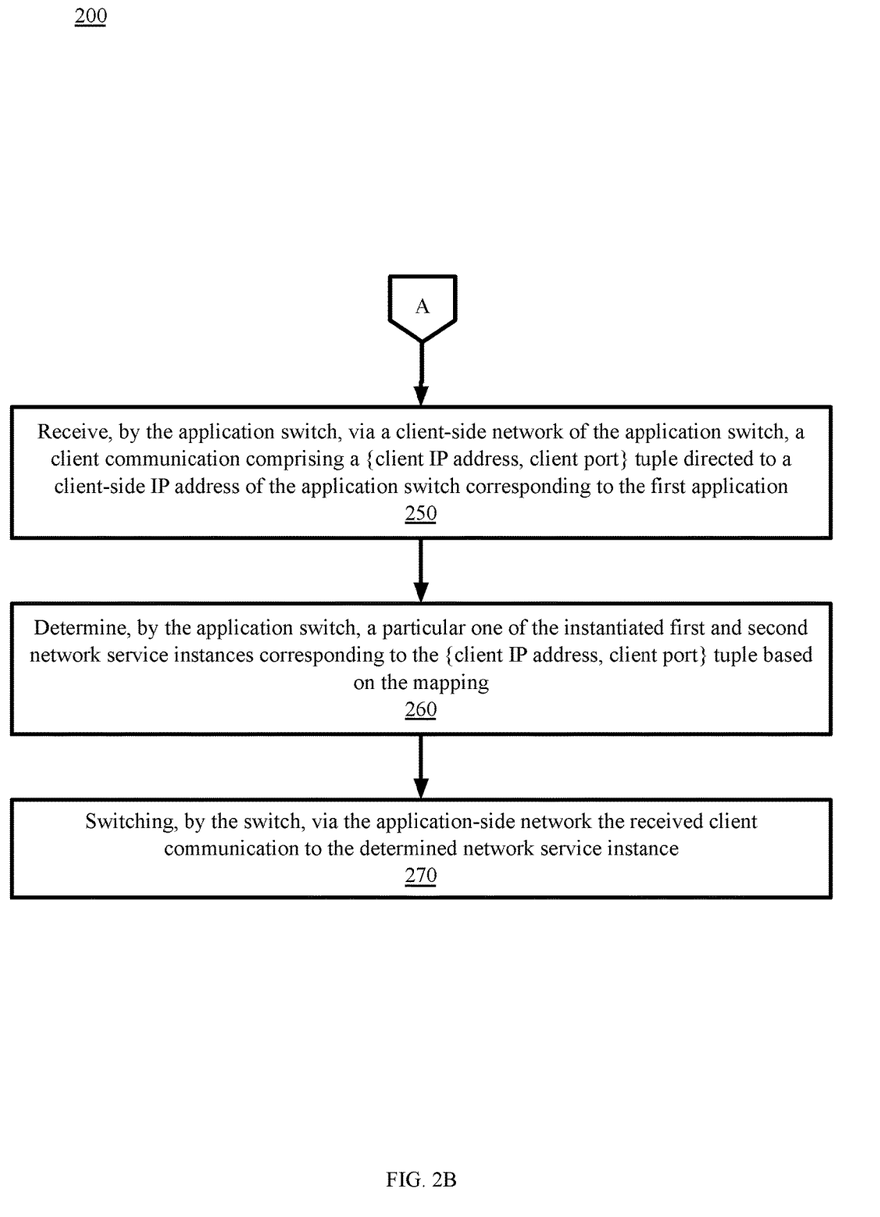

Referring to FIG. 2, and continuing to refer to FIG. 1 for context, a block flow diagram illustrating methods 200 to control computer networks to support application instantiation is shown, in accordance with certain example embodiments. In such embodiments, an application switch 110 instantiates a first network service instance 144 over an application-side network 199—Block 210.

The first network service instance 144 is characterized by an Internet Protocol (IP) address, an Open Systems Interconnection (OSI) reference model layer 2 (L2) media access control (MAC) address, and a supplemental L2 identifier of a first type and having a first value. The network service instance 144 establishes the communication channel from a first instance of a first application 146 to the application switch 110.

In the continuing example, application switch 110 instantiates network service instance 144 on host 120 with IP address "192.168.1.1," MAC address "AA," and a bridge domain identifier "BD1" as the supplemental L2 identifier over network 199 on host 120. Each bridge domain represents an L2 broadcast domain, and as a logical (as opposed to physical) identifier, a bridge domain can span multiple physical devices. The combination of MAC address and bridge domain establishes an L2 context for the network service instance 144 of {AA, BD1}. This L2 context is unique among network services instances of application switch 110. While a bridge domain identifier is used in the continuing example, any suitable L2 supplemental identifiers, such as a virtual local area network (VLAN) identifier and a virtual extensible local area network (VxLAN) identifier, can be used in other embodiments of the technology.

The application switch 110 receives a request to instantiate a network service instance associated with a second instance of the first application—Block 220. In the continuing example, the number of clients 160 requesting connection to the word processing application has increased beyond the 50 users supported by application instance 146. In response to this increased demand, the virtualization manager 140 requests the application switch to instantiate another network service instance to support an additional application instance that will serve the new users. In other embodiments, the application switch 110 determines that the number of clients requesting connection to the application has, or will likely, increase beyond the number of connections supported by the current application instance 146. In such embodiments, application switch 110 may be resident in an operating system partition in a networking control device.

In response to receiving the request, the application switch 110 instantiates a second network service instance 154—Block 230. The second network service instance 154 is characterized by the first application-side IP address, the MAC address, and a supplemental L2 identifier of the first type having a different value than the first value. The network service instance 154 establishes the communication channel from a second instance of a first application 156 to the application switch 110.

In the continuing example, application switch 110 instantiates network service instance 154 on host 130 with IP address "192.168.1.1," MAC address "AA," and a bridge domain identifier "BD2" as the supplemental L2 identifier over network 199 on host 120. This combination of MAC address and bridge domain establishes an L2 context for the network service instance 154 of {AA, BD2}. This L2 context is unique among the network services instances of application switch 110.

The application switch 110, maintains a mapping between a {<client IP address>, <client port>} tuple and a particular network service instance based on the supplemental L2 identifier of the particular network service instance—Block 240.

In the continuing example, the application switch 110 uses client 160 IP address and port {173.32.141.94, 80} and application instance 146, 156 information maintained by the virtualization managers 140, 150 to build a table relating each {<client IP address>, <client port>} tuple to a specific application name and L2 context {<MAC address>, <bridge domain ID>} tuple of the network service interface associated with the application instance. In the continuing example, virtualization manager 140 informs the application switch 110 that client 160 {173.32.141.94, 80} is related to application instance 146. Application switch 110 relates application instance 146 to network service instance 144 {AA, BD1}, so application switch 110 maintains the mapping {173.32.141.94, 80}<=>{AA, BD1}. Note that, in the continuing example, the mapping is a two way mapping.

The application switch 110 receives via a client-side network 99, a communication comprising a {<client IP address>, <client port>} tuple directed to a single client-side IP address of the switch 110 corresponding to the first application—Block 250. In the continuing example, the application switch 110 receives an IP packet from client 160 via client-side network 99 directed to application switch client-side IP address 123.45.167.1, the application switch client-side IP address for all traffic related to the first application. The message contains the {<client IP address>, <client port>} tuple {173.32.141.94, 80}. The message relates to a word processing command of the first application.

The application switch 110 determines a particular network service instance corresponding to the {<client IP address>, <client port>} tuple based on the mapping—Block 260. In the continuing example, the application switch 110 determines that {<client IP address>, <client port>} tuple {173.32.141.94, 80} corresponds to L2 context {AA, BD1} based on the mapping entry {173.32.141.94, 80}<=>{AA, BD1} maintained by the application switch 110.

The application switch 110 switches the received client communication to the determined network service instance via the application-side communications network 199—Block 270. In the continuing example, the application switch 110 switches the client 160 packet containing the {<client IP address>, <client port>} tuple {173.32.141.94, 80} to network service instance 144. Once switched to service instance 144, the client 160 packet is available to the application instance 146 corresponding to the {<client IP address>, <client port>} tuple and can be processed by the application instance 146.

The process described above with respect to blocks 250-270 can be practiced in reverse. In the continuing example, a communication prepared by application instance 146 and intended for the {<client IP address>, <client port>} tuple {173.32.141.94, 80} can be passed to network service instance 144. Network service instance 144 transmits a packet containing the communication to application switch 110, though, as between network service instance 144 and application switch 110, the {<client IP address>, <client port>} tuple is not used for routing or switching. Network service instance 144 uses the application-side IP address of the application switch 110 to transmit the packet containing the communication intended for {<client IP address>, <client port>} tuple {173.32.141.94, 80}.

The application switch 110 determines the destination {<client IP address>, <client port>} tuple by referring to the maintained table mapping {173.32.141.94, 80}<=>{AA, BD1} to forward the packet from application switch client-side IP address 123.45.167.1 to {173.32.141.94, 80}. In either direction, client-to-application instance and application instance-to-client, the client 160 is unaware of the details of the network service instance 144 that connects it to the application, and the client 160 is unaware that it is connected to application instance 146 via network service instance 144.

Figure 3:
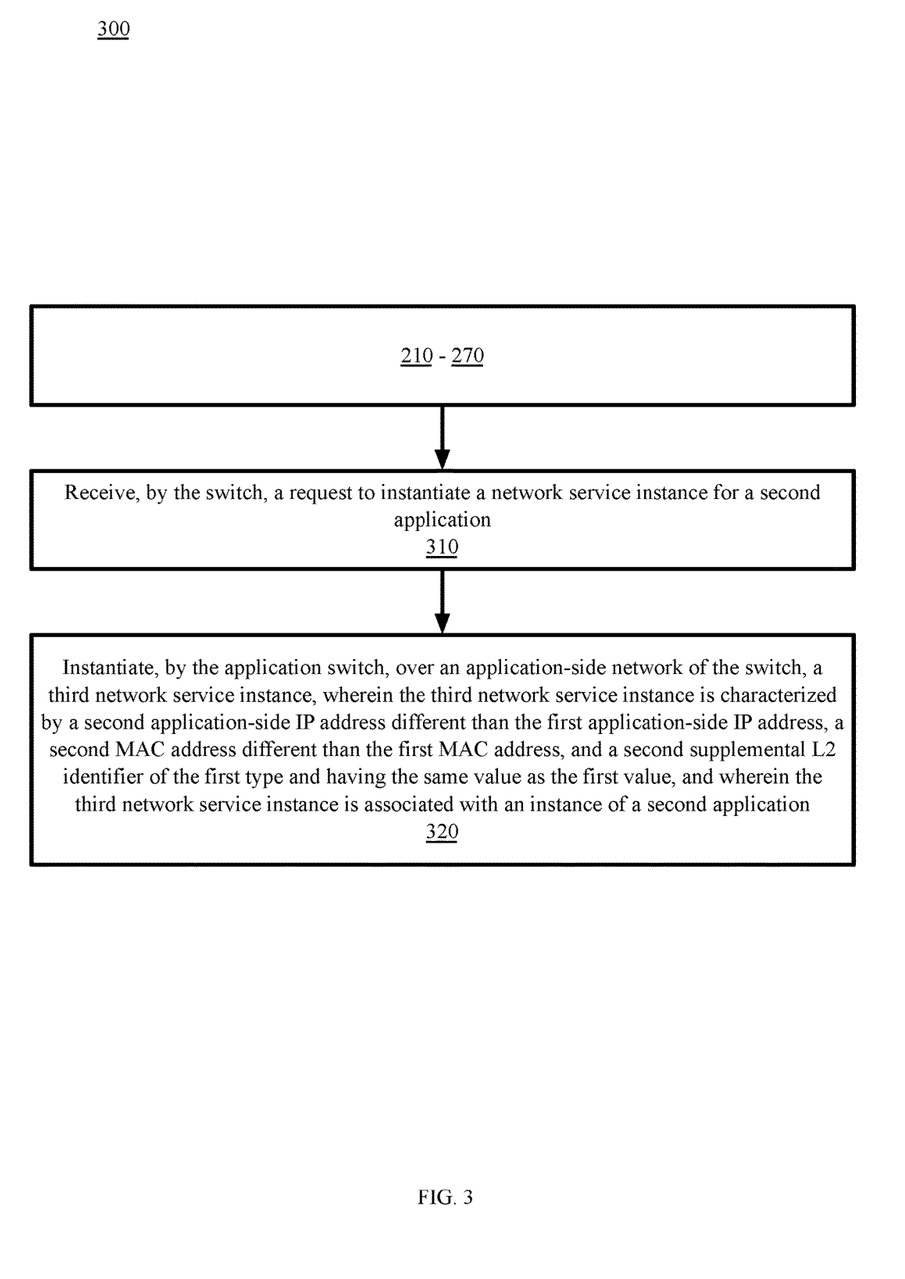
FIG. 3 is a block flow diagram depicting methods to control computer networks to support application instantiation, in accordance with certain example embodiments.

Referring to FIG. 3, and continuing to refer to prior figures for context, a block flow diagram illustrating methods 300 to control computer networks to support application instantiation is shown, in accordance with certain example embodiments. In such methods, Blocks 210-270 are performed as described above. In such methods, the application switch 110 receives a request to instantiate a network service instance for a second application—Block 310. In the continuing example, virtualization manager 150, at node 130, requests that the application switch 110 establish a network service instance for a spreadsheet application to be hosted in a container on host 150.

In response to the request to establish a network service instance for the second application, the application switch 110 instantiates a third network service instance, associated with an instance of a second application, over the application-side network of the application switch 110—Block 320. The third network service instance is characterized by a second application-side IP address different than the first application-side IP address, a second MAC address different than the first MAC address, and a second supplemental L2 identifier of the first type and having the same value as the first value.

In the continuing example, application switch 110 instantiates network service instance 157 on host 130 with IP address "192.168.1.2," MAC address "BB," and a bridge domain identifier "BD2" as the supplemental L2 identifier over network 199 on host 120. This combination of MAC address and bridge domain establishes an L2 context for the network service instance 157 of {BB, BD2}. This L2 context is unique among the network services instances of application switch 110. Note that while the L2 context is unique, the bridge domain, "BD2" is the same bridge domain used for the L2 context of network service instance 154—{AA, BD2}. Use of a bridge domain across the L2 context of different applications is possible, in part, because the MAC address differs between applications. Hence, an application switch able to support a limited number of bridge domains can still support many times more L2 contexts by using a different MAC address for network service instances having an L2 context characterized by the same bridge domain.

Other Example Embodiments

Figure 4:
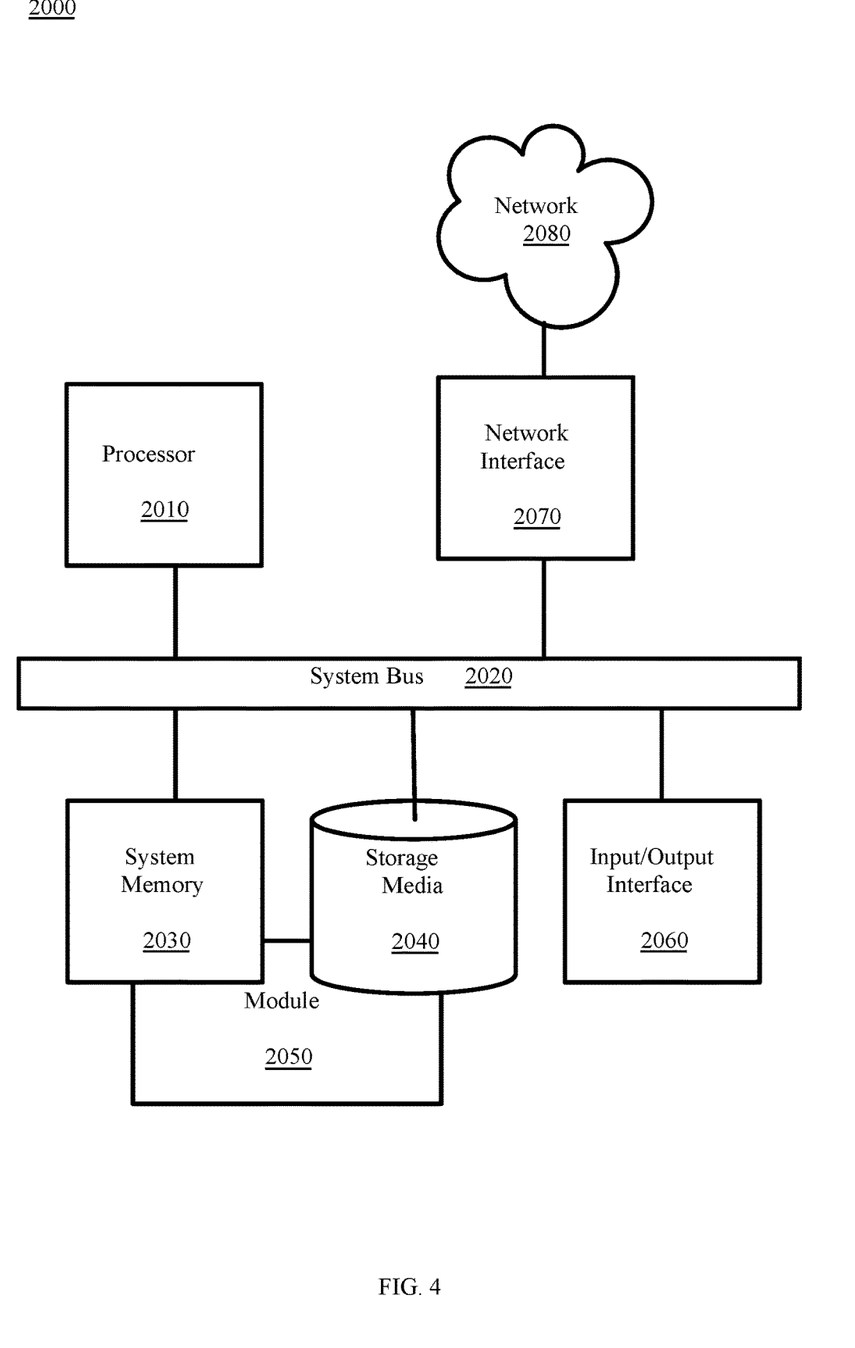
FIG. 4 is a block diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended block flow diagrams and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
    instantiating, by an application switch, over an application-side network of the application switch, a first network service instance, wherein the first network service instance is characterized by a first application-side Internet Protocol (IP) address, an Open Systems Interconnection (OSI) reference model layer 2 (L2) media access control (MAC) address, and a supplemental L2 identifier of a first type and having a first value, and wherein the first network service instance is associated with a first instance of a first application;
    receiving, by the application switch, a request to instantiate a network service instance associated with a second instance of the first application;
    instantiating, by the application switch, in response to receiving the request, a second network service instance, the second network service instance characterized by the first application-side IP address, the MAC address, and a supplemental L2 identifier of the first type having a different value than the first value;
    maintaining, by the application switch, a mapping between a {client IP address, client port} tuple and a particular instantiated network service instance based at least in part on the supplemental L2 identifier of a particular one of the instantiated first and second network service instances;
    receiving, by the application switch, via a client-side network of the application switch, a client communication comprising a {client IP address, client port} tuple directed to a client-side IP address of the application switch corresponding to the first application; and
    determining, by the application switch, a particular one of the instantiated first and second network service instances corresponding to the {client IP address, client port} tuple based on the mapping; and
    switching, by the application switch, via the application-side network, the received client communication to the determined particular one of the first and second network service instances.

2. The method of claim 1, wherein the supplemental L2 identifier first type is one of a bridge domain identifier, a virtual local area network (VLAN) identifier, and a virtual extensible local area network (VxLAN) identifier.

3. The method of claim 1, wherein the request is received by the application switch from a virtualization manager for the first application.

4. The method of claim 3, wherein the virtualization manager is one of:
    a hypervisor of virtual machines, and the first application instance executes in a virtual machine of the hypervisor; and
    a container manager, and the first application instance executes in a container of the container manager.

5. The method of claim 1, wherein the application switch is a virtual switch executing on a node device of the application-side network.

6. The method of claim 1, further comprising:
    receiving, by the application switch, a request to instantiate a network service instance for a second application; and
    instantiating, by the application switch and in response to the request to establish a network service instance for the second application, over an application-side network of the application switch, a third network service instance, wherein the third network service instance is characterized by a second application-side IP address different than the first application-side IP address, a second MAC address different than the first MAC address, and a second supplemental L2 identifier of the first type and having the same value as the first value, and wherein the third network service instance is associated with an instance of a second application.

7. The method of claim 1, wherein maintaining the mapping comprises receiving the mapping from a virtualization manager of the application instance associated with each instantiated network service instance.

8. A computer program product, comprising:
    a non-transitory computer-readable storage device having computer-executable program instructions embodied thereon that when executed by one or more computing devices cause the one or more computing devices to control computer networks to support application instantiation, the computer-executable program instructions comprising:
        computer-executable program instructions to instantiate, by an application switch, over an application-side network of the application switch, a first network service instance, wherein the first network service instance is characterized by a first application-side Internet Protocol (IP) address, an Open Systems Interconnection (OSI) reference model layer 2 (L2) media access control (MAC) address, and a supplemental L2 identifier of a first type and having a first value, and wherein the first network service instance is associated with a first instance of a first application;

computer-executable program instructions to receive, by the application switch, a request to instantiate a network service instance associated with a second instance of the first application;

computer-executable program instructions to instantiate, by the application switch, in response to receiving the request, a second network service instance, the second network service instance characterized by the first application-side IP address, the MAC address, and a supplemental L2 identifier of the first type having a different value than the first value;

computer-executable program instructions to maintain, by the application switch, a mapping between a {client IP address, client port} tuple and a particular instantiated network service instance based at least in part on the supplemental L2 identifier of a particular one of the instantiated first and second network service instances;

computer-executable program instructions to receive, by the application switch, via a client-side network of the application switch, a client communication comprising a {client IP address, client port} tuple directed to a client-side IP address of the application switch corresponding to the first application; and computer-executable program instructions to determine, by the application switch, a particular one of the instantiated first and second network service instances corresponding to the {client IP address, client port} tuple based on the mapping; and computer-executable program instructions to switch, by the application switch, via the application-side network, the received client communication to the determined network service instance.

9. The computer program product of claim 8, wherein the supplemental L2 identifier first type is one of a bridge domain identifier, a virtual local area network (VLAN) identifier, and a virtual extensible local area network (Vx-LAN) identifier.

10. The computer program product of claim 8, wherein the request is received by the application switch from a virtualization manager for the first application.

11. The computer program product of claim 10, wherein the virtualization manager is one of:
a hypervisor of virtual machines, and the first application instance executes in a virtual machine of the hypervisor; and
a container manager, and the first application instance executes in a container of the container manager.

12. The computer program product of claim 8, wherein the application switch is a virtual switch executing on node device of the application-side network.

13. The computer program product of claim 8, wherein the computer-executable program instructions further comprising:
computer-executable program instructions to receive, by the application switch, a request to instantiate a network service instance for a second application; and
computer-executable program instructions to instantiate, by the application switch and in response to the request to establish a network service instance for the second application, over an application-side network of the application switch, a third network service instance, wherein the third network service instance is characterized by a second application-side IP address different than the first application-side IP address, a second MAC address different than the first MAC address, and a second supplemental L2 identifier of the first type and having the same value as the first value, and wherein the third network service instance is associated with an instance of a second application.

14. The computer program product of claim 8, wherein maintaining the mapping comprises receiving the mapping from a virtualization manager of the application instance associated with each instantiated network service instance.

15. An application switch, comprising:
memory; and
one or more processors communicatively coupled to the memory, wherein the one or more processors execute instructions that are stored in the memory to cause the application switch to:
instantiate, by an application switch, over an application-side network of the application switch, a first network service instance, wherein the first network service instance is characterized by a first application-side Internet Protocol (IP) address, an Open Systems Interconnection (OSI) reference model layer 2 (L2) media access control (MAC) address, and a supplemental L2 identifier of a first type and having a first value, and wherein the first network service instance is associated with a first instance of a first application;
receive, by the application switch, a request to instantiate a network service instance associated with a second instance of the first application;
instantiate, by the application switch, in response to receiving the request, a second network service instance, the second network service instance characterized by the first application-side IP address, the MAC address, and a supplemental L2 identifier of the first type having a different value than the first value;
maintain, by the application switch, a mapping between a {client IP address, client port} tuple and a particular instantiated network service instance based at least in part on the supplemental L2 identifier of a particular one of the instantiated first and second network service instances;
receive, by the application switch, via a client-side network of the application switch, a client communication comprising a {client IP address, client port} tuple directed to a client-side IP address of the application switch corresponding to the first application; and
determine, by the application switch, a particular one of the instantiated first and second network service instances corresponding to the {client IP address, client port} tuple based on the mapping ping; and
switch, by the application switch, via the application-side network, the received client communication to the determined network service instance.

16. The application switch of claim 15, wherein the supplemental L2 identifier first type is one of a bridge domain identifier, a virtual local area network (VLAN) identifier, and a virtual extensible local area network (Vx-LAN) identifier.

17. The application switch of claim 15, wherein the request is received by the application switch from a virtualization manager for the first application.

18. The application switch of claim 17, wherein the virtualization manager is one of:

a hypervisor of virtual machines, and the first application instance executes in a virtual machine of the hypervisor; and a container manager, and the first application instance executes in a container of the container manager.

19. The application switch of claim 15, wherein the application switch is a virtual switch executing on node device of the application-side network.

20. The application switch of claim 15, wherein the one or more processors further execute instructions that are stored in the memory to cause the application switch to:

receive, by the application switch, a request to instantiate a network service instance for a second application; and instantiate, by the application switch and in response to the request to establish a network service instance for the second application, over an application-side network of the application switch, a third network service instance, wherein the third network service instance is characterized by a second application-side IP address different than the first application-side IP address, a second MAC address different than the first MAC address, and a second supplemental L2 identifier of the first type and having the same value as the first value, and wherein the third network service instance is associated with an instance of a second application.

* * * * *